United States Patent Office 2,724,678
Patented Nov. 22, 1955

2,724,678

HETEROCYCLIC MONOTHIOCARBONIC ACID ESTERS

Karl Gätzi and Paul Müller, Basel, Switzerland, assignors to J. R. Geigy A. G., Basel, Switzerland No Drawing. Application June 16, 1954,
Serial No. 437,297

Claims priority, application Switzerland June 19, 1953

9 Claims. (Cl. 167—33)

The present invention concerns new heterocyclic monothiocarbonic acid esters of the general formula:

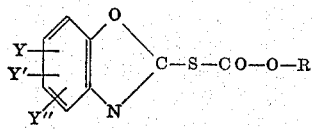

wherein

Each of Y and Y' represents hydrogen, lower alkyl, lower alkoxy or halogen, Y and Y' together a fused benzene ring, Y'' represents hydrogen or halogen, and R represents a lower alkyl radical.

It has now been found that such monothiocarbonic acid esters have an excellent fungicidal action. They are particularly suitable for the control of fungi growing on those parts of plants above the ground such as, e. g. Alternaria, Botrytis, Venturia and/or the spores thereof, and also as a seed dressing, e. g. against *Tilletia tritici* or Fusarium or also against Penicillium.

In the concentration necessary for the control of fungi they have no phytotoxic action and their toxicity to warm blooded animals is also slight.

The new compounds can be produced by reacting a haloformic acid ester of the general formula:

Hal—CO—O—R with a heterocyclic mercaptan of the general formula:

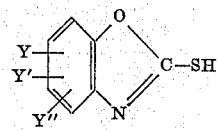

in the presence of an acid binding agent, or with a salt of such a mercaptan. In the above formulae, Hal represents chlorine or bromine and R has the meaning given above and X, Y, Y' and Y'' have the meanings given above. It is of advantage to perform the reaction in a solvent, as which water, methanol, ethanol, etc., are particularly suitable. The alkali and earth alkali metal hydroxides, the alkali metal carbonates, also organic tertiary bases such as pyridine, dimethylaniline, or triethylamine can be used as acid binding agents; an excess of organic base can serve at the same time as solvent. In particular alkali metal and earth alkali metal salts can be used as salts of heterocyclic mercaptans. A particularly advantageous method of performing the production process defined consists in the gradual addition of a chloroformic acid alkyl ester to the aqueous solution of an alkali metal salt of a heterocyclic mercaptan. By the simultaneous addition of alkali, the alkalinity of the solution is kept at such a level as will also prevent the precipitation of free mercaptan by the hydrochloric acid formed on the decomposition of a small part of the chloroformic acid alkyl ester. In this way, the reaction product precipitates in a practically pure state and can be isolated by filtration.

Of the heterocyclic mercaptans necessary as starting materials, apart from the basic compound 2-mercapto-benzoxazole, also a considerable number of the substituted compounds are known e. g. 5-chloro and 6-bromo-2-mercapto-benzoxazole; 2-mercapto-naphtho-1'.2':4.5-oxazole, and 2-mercapto-naphtho-1'.2':5.4-oxazole.

Further starting materials such as, e. g. 5.7-dichloro- and 4.5.7-trichloro-2-mercapto-benzoxazole, can also be produced by the methods usual for the known compounds. As haloformic acid esters in particular the chloroformic acid esters can be used which are easily obtained from phosgene and the corresponding alcohols such as for example, methanol, ethanol, propanol, isopropanol, butanol, isobutanol, sec, butanol, n-amyl alcohol and isoamyl alcohol.

Generally the new heterocyclic monothiocarbonic acid esters are solid crystalline substances. The following examples illustrate the production thereof. Parts are given as parts by weight and the relationship of parts by weight to parts by volume is as that of grammes to cubic centimetres. The temperatures are in degrees centigrade.

Example 1

15.1 parts of 2-mercapto-benzoxazole are dissolved in 100 parts by volume of normal caustic soda lye, cooled to 5–10° and, while stirring well, 15 parts of chloroformic acid methyl ester are added dropwise. The alkalinity of the solution is so adjusted by the simultaneous dropwise addition of 2N-caustic soda lye that litmus paper is coloured strongly blue but phenolphthalein paper is not yet coloured red. After one hour, the solution is made weakly phenolphthalein alkaline by the addition of a little diluted caustic soda lye, the reaction product which precipitates is drawn off under suction and well washed with water. After drying, the monothiocarbonic acid-S-benzoxazolyl-(2)-O-methyl ester can be recrystallised from acetone or methyl alcohol. M. P. 140–141° on decomposition. The yield is over 90%.

Example 2

20.7 parts of the sodium salt of 2-mercapto-5-chloro-benzoxazole are dissolved in 400 parts of anhydrous acetone. 10 parts of chloroformic acid methyl ester are added and the whole is heated for 4 hours under reflux. The reaction mass is poured into diluted sodium carbonate solution and the product which crystallises out is drawn off under suction. The monothiocarbonic acid-S-5-chloro-benzoxazolyl-(2)-O-methyl ester recrystallised from acetone melts at 166–167°.

The following compounds can also be produced by the processes described in Examples 1 to 2:

| No. | Formula | M. P. |
|---|---|---|
| 1 | (hexahydrobenzoxazole)C—S—CO—O—CH₂—CH₃ | 93–94°. |
| 2 | (hexahydrobenzoxazole)C—S—CO—O—CH₂—CH₂—CH₂—CH₃ | 64.5–65.5°. |
| 3 | (dichloro-hexahydrobenzoxazole)C—S—CO—O—CH₃ | 167–170° on decomposition. |
| 4 | (trichloro-hexahydrobenzoxazole)C—S—CO—O—CH₃ | 92–98°. |
| 5 | (methyl-hexahydrobenzoxazole)C—S—CO—O—CH₃ | 146–148°. |
| 6 | (methyl-chloro-hexahydrobenzoxazole)C—S—CO—O—CH₃ | 216° on decomposition. |
| 7 | (methoxy-hexahydrobenzoxazole)C—S—CO—O—CH₃ | 143–144°. |
| 8 | (decahydronaphth-oxazole)C—S—CO—O—CH₃ | 85–86°. |
| 9 | (bromo-hexahydrobenzoxazole)C—S—CO—O—CH₂—CH₃ | |
| 10 | (ethoxy-hexahydrobenzoxazole)C—S—CO—O—CH₃ | |
| 11 | (isopropyl-hexahydrobenzoxazole)C—S—CO—O—CH₂—CH₂—CH₂—CH₃ | |

The excellent fungicidal activity of the new compounds according to the present invention can be seen for example from the results of slide germination tests which are summarised in the following table. The concentrations given therein are the concentrations expressed in parts per thousand of those acetone solutions of the tested compounds which produce a residue capable of preventing the germination of at least 9/10 of the spores of the fungi on the slides in a damp atmosphere. The tests are carried out in the following manner: One milliliter of each acetone solution is sprayed through a fixed spray nozzle over four slides, laid side by side in the center of the sprayed area. In this way, the slides, after drying, are covered as uniformly as possible with always the same amounts of active substance. Suspensions of the spores of each species of fungi to be tested are then prepared, and two single droplets of each suspension are put on a slide of every type. As check tests, untreated slides are inoculated with spores in the same way. Germination of the spores is induced by storing the slides in a damp atmosphere at about 20° C.

The value "1" in the table corresponds to the residue of a solution of the concentration of 0.1%.

The new heterocyclic monothiocarbonic acid esters can be used as such or combined with suitable carriers and distributors and, if desired, other fungicidal or insecticidal substances for the protection of plants and parts thereof from attack by injurious fungi. They are also suitable, however, for the treatment of organic materials such as, e. g. wood, textiles, furs and leather.

For example, the active ingredients can be combined with solid pulverulent carriers such as, e. g. talcum, kaolin, bole, bentonite, chalk, ground limestone, and if desired, the pulverulent fungicides so obtained can be made suspendable in water by the addition of wetting and dispersing agents. Further, with the aid of suitable emulsifiers, the active substances can also be dispersed in water or in organic solvents, e. g. chlorinated hydrocarbons such as trichlorethylene, or in medium petroleum fractions, if desired with the addition of auxiliary solvents such as acetone or higher ketones. The active ingredients can also be used dispersed in the air in the form of aerosols, smoke or steam, in particular, e. g. in store rooms and greenhouses.

*Example 3*

2–5 parts of monothiocarbonic acid-S-benzoxazolyl-(2)-O-methyl ester are ground with 98–95 parts of talcum. The pulverulent fungicide so obtained can also be used, e. g. for the disinfection of bedding earth and also for the dusting of plants or parts thereof such as bulbs and tubers.

| No. | Formula | Alternaria tenuis | Aspergillus versicolor | Botrytis cinerea | Coniothyrium diplodiella | Fusarium culmorum | Macrosporium spec. | Penicillium crustaceum |
|-----|---------|-------------------|------------------------|------------------|--------------------------|-------------------|---------------------|------------------------|
| 1 | benzoxazolyl-C-S-CO-O-CH$_3$ | 0.1 | --------- | 0.1 | 0.1 | 1 | 10 | 0.1 |
| 2 | benzoxazolyl-C-S-CO-O-CH$_2$-CH$_3$ | 1 | 0.1 | 0.1 | 0.1 | 0.1 | 0.1 | 0.1 |
| 3 | CH$_3$-benzoxazolyl-C-S-CO-O-CH$_3$ | 0.1 | 0.1 | 0.1 | 0.1 | 0.1 | 1 | 0.1 |
| 4 | Cl-benzoxazolyl-C-S-CO-O-CH$_3$ | 1 | 0.1 | 0.1 | 1 | 0.1 | 0.1 | 0.1 |
| 5 | Cl,Cl-benzoxazolyl-C-S-CO-O-CH$_3$ | 10 | 0.1 | 0.1 | 0.1 | 0.1 | 10 | 1 |
| 6 | naphthoxazolyl-C-S-CO-O-CH$_3$ | 1 | 1 | 1 | 1 | 0.1 | 10 | 1 |

If the content of active ingredient is raised to 15 parts and some adhesive is added, a very strongly active fungicide is obtained which is at the same time a non-toxic dry seed dressing which does not affect germination.

*Example 4*

By grinding together 10 parts of monothiocarbonic acid-S-(5-chlorobenzoxazolyl-(2))-O-methyl ester and 82 parts of kaolin or chalk and mixing with 8 parts of wetting and dispersing agents, e. g. 5 parts of sulphite waste liquor and 3 parts of ethylene oxide condensation products of alkyl phenols, a concentrate is obtained which on mixing with water, produces a fungicidal spraying agent which is excellently suitable for the treatment of the parts of the plants which are above the ground.

*Example 5*

20 parts of monothiocarbonic acid-S-benzoxazolyl-(2)-O-methyl ester, 40 parts of xylene and 30 parts of ethylene oxide condensation products of alkyl phenols are mixed together. An emulsion concentrate is produced which can be used for the preparation of emulsions in plant protection.

A concentrate for the preparation of emulsions having a less strong wetting action can be obtained by mixing 25 parts of active ingredient, 67 parts of xylene and 8 parts of ethylene oxide condensation products.

What we claim is:

1. A heterocyclic monothiocarbonic acid ester corresponding to the formula

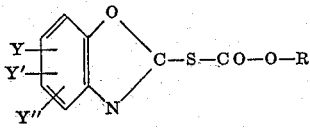

wherein each of Y and Y' represents a member selected from the group consisting of hydrogen, lower alkyl, lower alkoxy and halogen, and Y and Y' together represent a fused benzene ring, Y" represents a member selected from the group consisting of hydrogen and halogen, and R represents a lower alkyl radical.

2. A heterocyclic monothiocarbonic acid ester corresponding to the formula

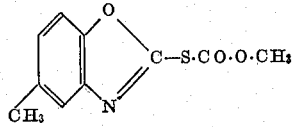

3. A heterocyclic monothiocarbonic acid ester corresponding to the formula

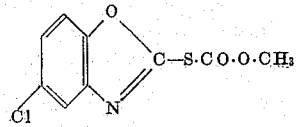

4. A heterocyclic monothiocarbonic acid ester corresponding to the formula

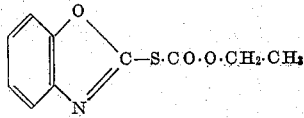

5. A heterocyclic monothiocarbonic acid ester corresponding to the formula

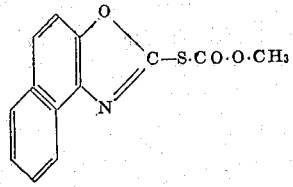

6. A fungicidal composition comprising a compound as claimed in claim 1 and a fungicide carrier therefor.

7. A fungicidal composition comprising a compound as claimed in claim 1 and an inert pulverulent fungicide carrier therefor.

8. A fungicidal composition comprising a compound as claimed in claim 1 and an inert pulverulent fungicide carrier therefor together with a surface active agent.

9. A fungicidal composition comprising a compound as claimed as in claim 1 and a surface active agent.

References Cited in the file of this patent
UNITED STATES PATENTS

| | | |
|---|---|---|
| 2,419,294 | Skaptason | Apr. 22, 1947 |
| 2,516,313 | Goddin et al. | July 25, 1950 |
| 2,614,957 | Sommerville | Oct. 21, 1952 |

FOREIGN PATENTS

| | | |
|---|---|---|
| 500,197 | Great Britain | Jan. 30, 1939 |